(12) United States Patent
Morton

(10) Patent No.: US 7,970,280 B2
(45) Date of Patent: Jun. 28, 2011

(54) THERMALLY-FLOATING TRANSMITTER WAVELENGTH GRID OF SIGNAL CHANNELS IN A WDM TRANSMISSION SYSTEM

(75) Inventor: Paul A. Morton, West Friendship, MD (US)

(73) Assignee: Infinera Corporation, Sunnyvale, CA (US)

( * ) Notice: Subject to any disclaimer, the term of this patent is extended or adjusted under 35 U.S.C. 154(b) by 610 days.

(21) Appl. No.: 11/254,199

(22) Filed: Oct. 19, 2005

(65) Prior Publication Data

US 2006/0088319 A1   Apr. 27, 2006

Related U.S. Application Data

(60) Provisional application No. 60/622,248, filed on Oct. 26, 2004.

(51) Int. Cl.
   *H04J 14/02*   (2006.01)
(52) U.S. Cl. ................. 398/79; 398/91; 398/68; 398/83; 398/140
(58) Field of Classification Search .................... 398/79, 398/83, 49, 140, 48, 68, 91
See application file for complete search history.

(56) References Cited

U.S. PATENT DOCUMENTS

| | | | | |
|---|---|---|---|---|
| 5,557,439 A * | 9/1996 | Alexander et al. | ............... | 398/87 |
| 5,933,265 A * | 8/1999 | Nagarajan | ..................... | 398/208 |
| 5,978,117 A * | 11/1999 | Koonen | ........................ | 398/116 |
| 6,658,175 B2 * | 12/2003 | Zami et al. | ...................... | 385/16 |
| 6,868,198 B2 * | 3/2005 | Sunaga et al. | .................. | 385/18 |
| 6,937,795 B2 * | 8/2005 | Squires et al. | .................. | 385/37 |
| 7,212,738 B1 * | 5/2007 | Wang | ................................. | 398/2 |
| 7,251,386 B1 * | 7/2007 | Dickinson et al. | .............. | 385/14 |
| 7,570,845 B2 * | 8/2009 | Welch et al. | .................... | 385/14 |
| 7,636,522 B2 * | 12/2009 | Nagarajan et al. | ............. | 398/79 |
| 2002/0021464 A1 * | 2/2002 | Way | ................................. | 359/124 |
| 2002/0067525 A1 * | 6/2002 | Sakamoto et al. | ............ | 359/124 |
| 2002/0118668 A1 * | 8/2002 | Sawey et al. | .................. | 370/350 |
| 2003/0095737 A1 * | 5/2003 | Welch et al. | .................... | 385/14 |
| 2004/0208582 A1 * | 10/2004 | Lemoff et al. | .................. | 398/85 |

* cited by examiner

*Primary Examiner* — Ken N Vanderpuye
*Assistant Examiner* — Hibret A Woldekidan
(74) *Attorney, Agent, or Firm* — W. Douglas Carothers, Jr.; David L. Soltz

(57) ABSTRACT

A method and apparatus is provided for tracking a thermally floating wavelength signal channel grid generated at an optical transmitter (Tx) in an optical transmission system or optical network where the wavelengths of the individual Tx signal channels may move in wavelength due to, for example, changes in ambient temperature at the optical transmitter but the channel spacing between Tx signal channels along the thermally floating Tx wavelength grid remains constant. An optical receiver (Rx) is provided that has a demultiplexed signal channel grid that may have a different channel spacing from that of the floating Tx wavelength grid, that is either larger, the same as, or smaller Rx grid spacing compared to the Tx grid spacing, and includes a number of demultiplexed channel signal outputs along an Rx channel grid in excess of the number of Tx signal channels on the Tx channel grid so that the optical receiver is capable of detecting the floating Tx channel grid and providing electrical output signals representative of the Tx channel signals transported over the optical network.

12 Claims, 9 Drawing Sheets

THERMALLY-FLOATING TRANSMITTER WAVELENGTH GRID OF SIGNAL CHANNELS IN A WDM TRANSMISSION SYSTEM

REFERENCE TO RELATED APPLICATION

This application claims priority of U.S. provisional patent application Ser. No. 60/622,248, filed Oct. 26, 2004, which application is incorporated herein by its reference.

BACKGROUND OF THE INVENTION

1. Field of Invention

This invention relates generally to optical transmission systems or networks and more particularly to optical transmitters and optical receivers operated with a thermally floating wavelength grid of optical signal channels where the individual channel signals at the optical transmitter grid channels are not held to a fixed and predetermined wavelengths along a standardized wavelength grid, such as the recommended ITU wavelength grid via G.692.

2. Description of the Related Art

In a conventional dense wavelength division multiplexed (DWDM) communication system available today from telecommunication service provider equipment manufacturers, the generation of a considerable amount of heat is commonplace and is a major limitation to decreasing the size, power, and cost of such equipment. The use of monolithically integrated photonic devices, such as electro-absorption modulated lasers (EMLs), optical transmitter photonic integrated circuits (TxPICs) and optical receiver photonic integrated circuits (RxPICs), which incorporate multiple electro-optic functions into a single semiconductor chip, can significantly reduce the overall power requirements of an optical transmitter module and optical receiver module. See, for example, examples of such TxPICs and RxPICs in respective patent applications, Ser. No. 10/267,331, filed Oct. 8, 2002, published on May 22, 2003 as Pub. No. US 2003/0095737 A1, and Ser. No. 10/267,304, filed Oct. 8, 2002, published Feb. 19, 2004 as Pub. No. US 2004/0033004 A1, which applications are incorporated in their entirety herein by their reference. The large-scale integration of these types of photonic integrated circuits (PICs) provides a large increase in functionality with an associated significant reduction in overall power, weight, size and cost. Although this kind of integration has demonstrated reduced power consumption, the thermoelectric cooler (TEC) or a Peltier cooler are still required to cool these PIC chips and can consume up to four to ten times as much power as the chip or chips themselves that are being cooled to maintain their operation at a designated operating temperature so that the transmitter modulated sources maintain their emission wavelengths along a standardized wavelength grid. This large power consumption via the use of such coolers significantly diminishes the effects of improvements made in device power requirements of such large-scale integration devices. Furthermore, the additional power utilized by the TEC increases the required heat sink size, weight, and cost, often exponentially. Thus, there is a major reason, as well as technical challenge, to remove the requirement for a TEC in the operation of such PICs.

As employed throughout this disclosure, "modulated sources" means either a modulated semiconductor laser source or a cw operated semiconductor laser in combination with an external electro-optic modulator which may be independent or integrated together which are referred to as electro-optic (electro-absorption) modulator/lasers (EMLs).

A major challenge in realizing an uncooled DWDM optical transmitter is maintaining the operating wavelengths of the multiple on-chip laser diodes in spite of changing ambient temperatures. DWDM implies an accurate control of the transmitter wavelength, whereas changing environmental temperature in a TxPIC, for example, inherently works also to change the wavelength of the on-chip laser diode transmitters. In this disclosure, a new and dramatic DWDM system approach is disclosed where thermal control of PIC chips such as EMLs, TxPICs or RxPICs in an optical transponder or transceiver module is absence to allow these integrated semiconductor devices to operate uncooled on a continuous basis regardless of any change in the emission wavelengths of the on-chip laser diodes.

SUMMARY OF THE INVENTION

According to this invention, a method and apparatus is provided for tracking a thermally floating wavelength signal channel grid generated at an optical transmitter (Tx) in an optical transmission system or optical network where the wavelengths of the individual Tx signal channels may move in wavelength due to, for example, changes in ambient temperature at the optical transmitter but the channel spacing between adjacent Tx signal channels along the thermally floating Tx wavelength grid remains constant. An optical receiver (Rx) is provided that has a demultiplexed signal channel grid that has a different channel spacing from that of the floating Tx wavelength grid, that is the Rx grid spacing may be either larger or smaller compared to the Tx grid spacing. The optical receiver (Rx) includes a number of demultiplexed channel signal outputs along an Rx channel grid in excess of the number of Tx signal channels on the Tx channel grid so that the optical receiver is capable of detecting the transmitted floating Tx channel grid and providing electrical output signals representative of the Tx channel signals transported over the optical network.

This invention further relates to a determination of the location of a thermally-shifted wavelength grid, $N_1$, of signal channels from an optical transmitter (Tx) and received at an optical receiver (Rx) by having a wavelength channel grid of receivable signal channels, $N_2$, at an optical receiver (Rx) to be larger than that of the wavelength grid of signal channels, $N_1$, generated at the transmitter (Tx), i.e., $N_2 > N_1$. Further, the signal channel spacing, $S_1$, at the Tx is either larger, smaller or the same as the signal channel spacing, $S_2$, at the Rx. In the case where the channel spacing, $S2$, at the receiver (Rx) is the same as, or larger than the Tx channel spacing, $S1$, coding and/or multi-level receiving at each receive channel can be utilized to recover the Tx channel information. As an example, the frequency or wavelength grid spacing, $S_2$, at the optical receiver may be one-half of the frequency or wavelength grid spacing, $S_1$, of the transmit Tx signal channels, i.e., $S_1 > S_2$, in combination with additional Rx reception grid channels, $N_2$, included at the optical receiver provided at as well as divided between the two ends of the possible wavelength transmission band of Tx signal channels, $N_1$, due to laser source wavelength drift, and which allows for a temperature mismatch due to the floating wavelength grid at the Tx. Therefore, correspondingly, a wavelength mismatch between the thermally floating grid of the Tx signal channels transmitted from the optical transmitter to the wider Rx reception channel grid provided at the optical receiver ($N_2 > N_1$) is enabling the Rx channel grid to photonically capture or recover the grid of transmitted channel signals from the optical transmitter. As a result, a coolerless optical transmitter is possible and the expense of thermal control and stabilization is eliminated at the optical transmitter.

With respect to a coolerless transmitter, also the optical receiver (Rx) may or may not be floating so that, if the Rx wavelength channel grid of the Rx multiplexer is floating due to no cooling mechanism at the receiver, then reception of the floating Tx wavelength grid at the Rx combiner can still be detected, demultiplexed into individual optical channel signals and converted into respective electrical signals.

This invention is explained in connection with optical transmitters that comprise a plurality of integrated signal channels providing channel signals on waveguide outputs to an integrated multiplexer or wavelength selective combiner forming a transmitter photonic integrated circuit (TxPIC) and optical receivers comprising an integrated demultiplexer or wavelength selective decombiner with a plurality of waveguide outputs to a plurality of integrated photodetectors forming a receiver photonic integrated circuit (RxPIC) and, further where the TxPIC and optionally the RxPIC are operated coolerlessly, that it there is no thermal control over their ambient temperature. However, it should be noted that the invention is also applicable to an optical transmitter that contains discrete modulated sources coupled via optical waveguides (e.g., fiber coupled) to a discrete multiplexer or wavelength selective combiner where the Tx grid spacing of the modulated sources are maintained at least in substantially fixed relation even through the grid spacing may vary a little. This is particularly true in the case where the transmitter channel grid spacing among the discrete modulated sources is comparatively a large separation, such as, for example, 200 GHz or more, providing for low channel crosstalk. Optionally, one way the grid spacing of the discrete modulated sources could be fairly maintained, of course, is with a cooler (TEC or Peltier cooler) in such a transmitter module to maintain the ambient temperature of the module at a predetermined value so that the wavelength outputs of the modulated sources remain at their designed wavelength values with a fixed grid spacing. However, this defeats, in part, one of the goals of this invention of operating the optical transmitter in a coolerless state. Alternatively, to avoid the use of such a cooler, the ambient temperature of the optical module could be maintained at a predetermined heated temperature level that would substantially maintain the desired wavelength grid spacing of the discrete modulated source array.

Other objects and attainments together with a fuller understanding of the invention will become apparent and appreciated by referring to the following description and claims taken in conjunction with the accompanying drawings.

DETAILED DESCRIPTION OF THE INVENTION

Figure 1:
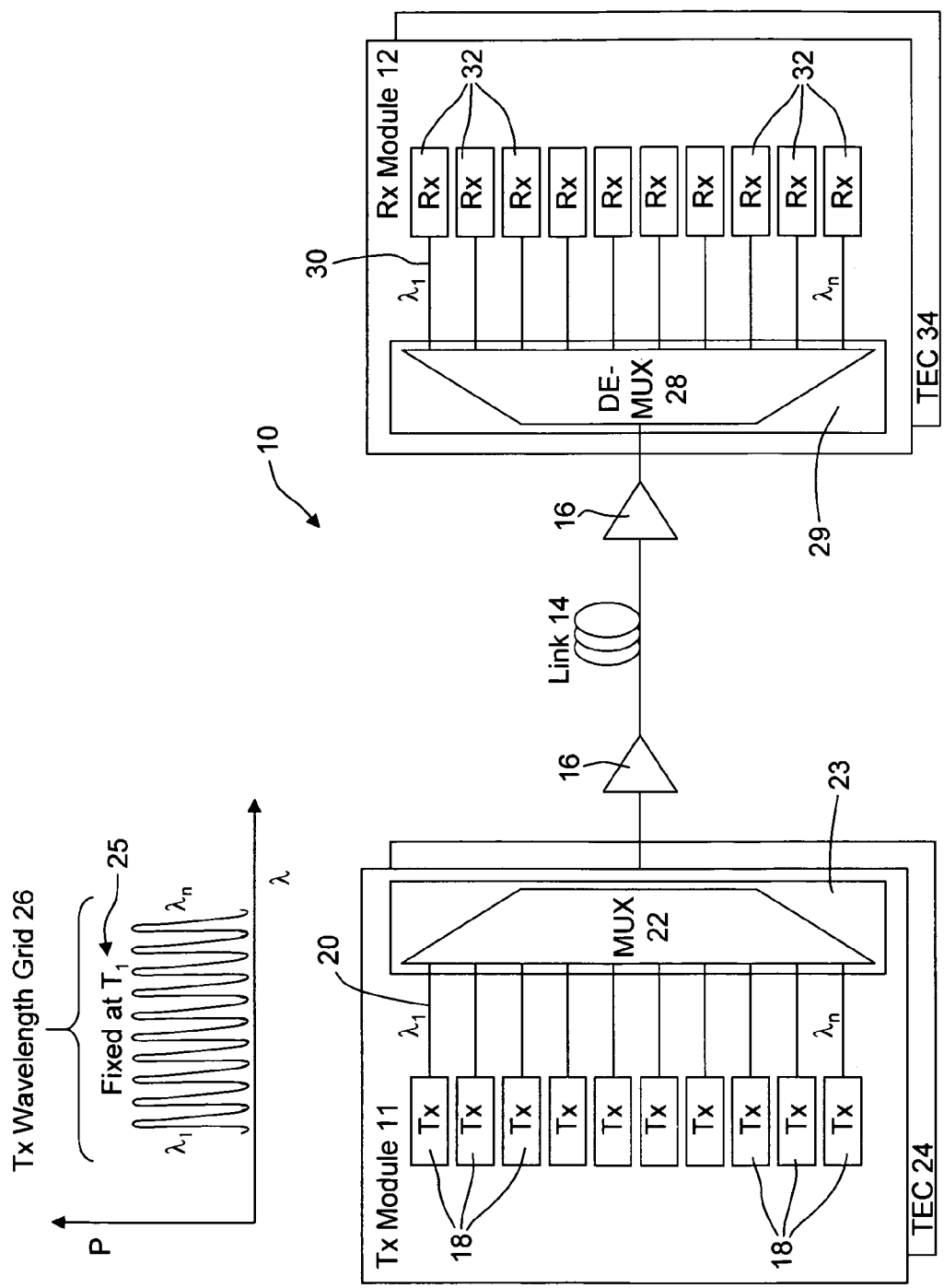
FIG. 1 is a block diagram illustrating a conventional wavelength division multiplexing (WDM) system that may utilize the present invention.

Reference is now made to FIG. 1 which illustrates a conventional wavelength division multiplexing system or optical network 10. An optical transmitter module (Tx) 11 is optically coupled to an optical receiver module (Rx) 12 via an optical medium or link 14. The link 14 may include one or more optical amplifiers 16 to amplify the multiplexed signal in its transmission over link 14. Tx module 11 includes a plurality of optical transmitters 18 which number N and each provided with a modulated source at a designated wavelength on a standardized grid, such as the ITU grid. The grid of wavelengths $\lambda_1$ to $\lambda_n$ is shown at the top of FIG. 1 at 26 where the grid wavelengths are maintained at their desired wavelengths by means of fixing the temperature at the module to $T_1$ as indicated at 25. Each of the transmitters may be a discrete modulated source or all or some of the transmitters 18 may be integrated on a single chip as illustrated in incorporated Pub. No. US 2003/0095737 A1. By "modulated source", it is meant that either a semiconductor laser, such as, for example, a DFB laser or a DBR laser, is modulated with a signal to be transmitted at a designated wavelength or a semiconductor laser is operated cw and is optically coupled to an external modulator, such as an electro-optic modulator, which may be, but not limited to, an electro-absorption modulator or a Mach Zehnder modulator. The modulated outputs 20, which are also referred to as signal channels, from transmitters 18 are provided to an optical multiplexer 22 where the modulated source outputs are combined into a single WDM signal for transport on link 14. Tx module 11 generally includes a temperature controller or thermal-electric cooler (TEC) 24 to maintain the temperature of the module at predetermined temperature, $T_1$, as seen at 25, so that the wavelength grid 26 of N transmitters 18 are maintained at their designated wavelengths, $\lambda_1$ to $\lambda_N$, at a controlled temperature via the TEC. Also, it may be desired to control the wavelength grid of multiplexer 22 via a separate heater or cooler 23 so that TEC 24 can control the temperature of transmitters 18 and heater 23 can control the wavelength grid of multiplexer 22 to be matched closer to the wavelength grid 26 of transmitters 18. Also, in the case where transmitters 18 are formed on a TxPIC chip, their modulated sources may each have a local heater (not shown) which, in combination with the integrated MUX heater 23, may be deployed to control the wavelength grids of both the on-chip laser sources and the on-chip MUX as taught in patent application Pub. No. US 2003/0095736 A1, published on May 22, 2003.

At the optical receiver (Rx) module 12, the transmitted WDM signal is received by the Rx module demultiplexer 28 where the WDM signal is separated into the individual channel signals of $\lambda_1$ to $\lambda_n$ on optical output waveguides 30 for reception by receivers 32. Receivers 32 may be comprised of a plurality of photodetectors and TIA circuits to receive their respective optical signals, convert the received signal to a photocurrent and provide a voltage output which is an electrical signal representation of the original transmitted optical signal. Such photodetectors may be avalanche photodiodes or PIN photodiodes. The receivers 32 may be discrete receiver devices, or may be integrated on a single chip, or may be integrated on a single semiconductor chip with demultiplexer 28 to form an RxPIC which circuits are illustrated in incorporated Pub. No. US 2004/0033004 A1. Rx module 12 may also have its own TEC 34 to control the temperature ambient of the module as well as control the wavelength grid of demultiplexer to be better aligned to the fixed wavelength grid 26 of the incoming WDM signal from link 14.

It should be understood that in order for the Rx module 12 to adequately receive the WDM signal transmitted from the Tx module 11, the wavelength grid peaks of demultiplexer 28 must fairly match the wavelength grid peaks of the inbound channel signals of the WDM signal so that the WDM signal can be properly demultiplexed into the individual channel signals at module 12. This is generally accomplished by keeping the Tx wavelength grid 26 at a fixed, predetermined temperature, $T_1$, through control of TEC 24 and/or heater/cooler 23. With the wavelength grid 26 fixed in this predetermined fashion, the wavelength grid of demultiplexer 28 may be shifted via TEC 34 and/or heater/cooler 29 to more closely match the center peak of the wavelength grid 26 for optimum reception of transmitted channel signals $\lambda_1$ to $\lambda_n$ in optical network 10.

Figure 2:
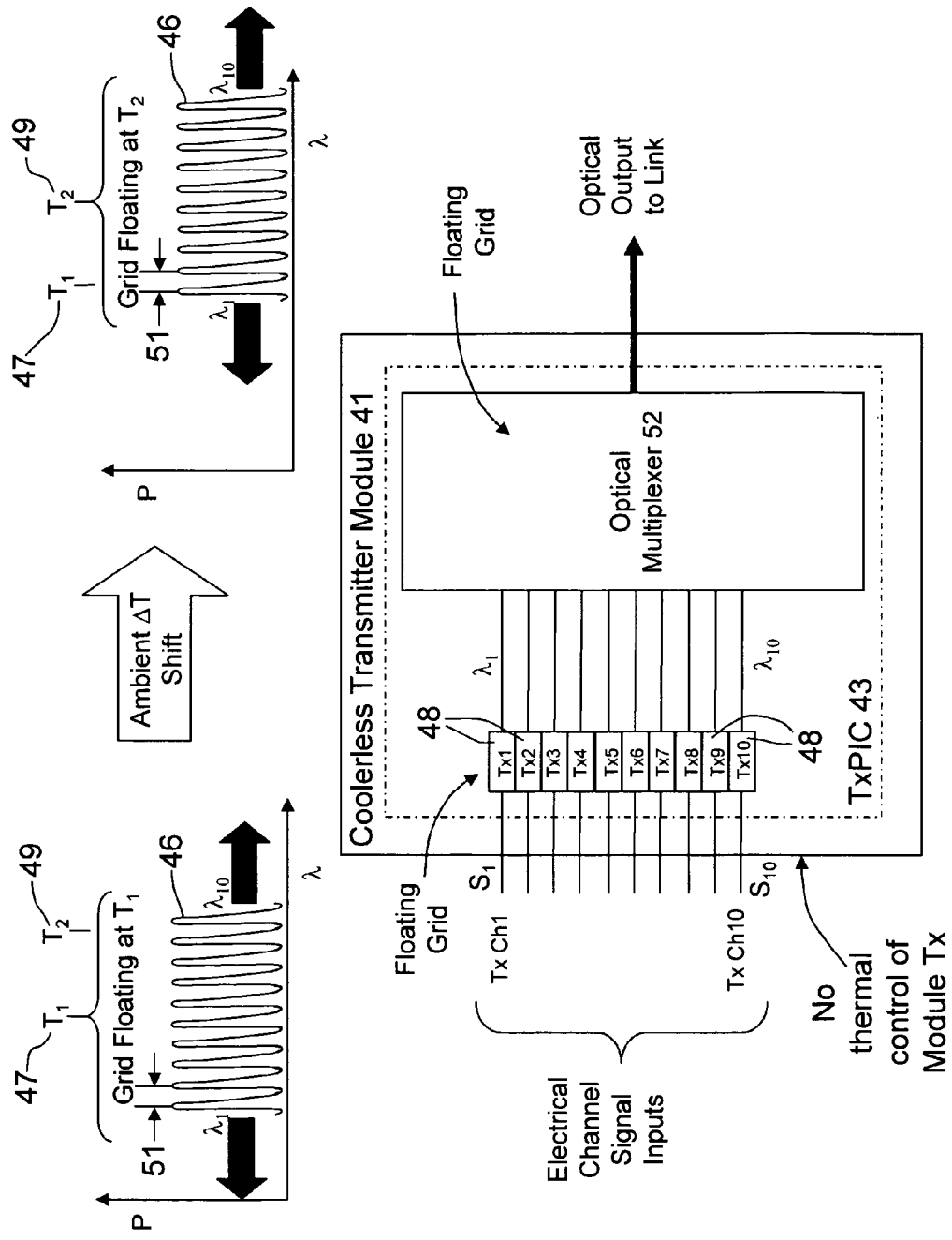
FIG. 2 is a more detailed view of the transmitter module utilized in the practice of this invention.

As indicated previously, however, the full utility and cost savings of placing all optical signal channels on a single semiconductor chip is somewhat diluted by the need to maintain the wavelength grid 26 of the PIC channel signals on their designated ITU grid wavelengths through feedback wavelength stabilization and thermal tuning of the modulated source emission wavelengths as well as thermal tuning of the wavelength grid of the integrated optical multiplexer as taught, for example, in Pub. No. US 2003/0095736 A1, supra. In particular, the multiple thermal tuning mechanisms add to the costs of the system as well as, in addition, may require a TEC to thermally control the PIC chip ambient. In this invention, the tuning of the wavelength grid of the modulated sources and the wavelength grid of the optical multiplexer are not thermally maintained but rather left to thermally float, i.e., the Tx module 41, as seen in FIG. 2, is operated coolerless with no means provided for controlling the temperature of the modulated sources 48 or the multiplexer 52 integrated as a single TxPIC. Also, the Rx module 42 may be also floating as, indicated in FIG. 3 as being coolerless, so that the Tx module 41 and the Rx module 42 are both uncooled, operating in different and separate temperature environments. However, it is within the scope of this invention to tune the Rx channel grid to some extent, such as by means of a heater on the optical receiver demultiplexer 58, relative to the transmitted Tx channel grid.

In FIG. 2, coolerless transmitter module 41 comprises TxPIC chip 43 with N-equal-ten transmitters 48 forming a transmit or Tx wavelength grid 46, $\lambda_1$ to $\lambda_{10}$, of emission wavelengths from the Tx modulated sources. As will be seen later, the Tx channel count, $N_1$, is less then the Rx channel count, $N_2$, in the optical network, i.e., $N_2 > N_1$. The channel modulated signal outputs from transmitters 48 are provided to an integrated optical multiplexer 52, which is a wavelength selective type of combiner, where channel signals are combined into a WDM signal for transport on an optical link from an optical output of the TxPIC. Obviously, the number of signal channels can be greater than ten so that the description here of a ten-channel TxPIC is purely for illustrative purposes.

Since module 41 is coolerless, that is there are no controls present in module 41 to maintain the temperature ambient of either the modulated sources 48 or the multiplexer 52 and, therefore, the source wavelength grid may thermally shift with changes in temperature while the fixed channel spacing relationship among the several signal channels, i.e., the channel spacing between wavelengths remains fixed. This is because the grating period of the laser sources is fixed with respect to each source in their manufacture so that the initially tuned wavelengths follow a uniform grid spacing 51 from one another, as illustrated for instance, in FIG. 3A. As an example, the grid channel spacing may be at 50 GHz, 100 GHz or 200 GHz spacing between adjacent laser sources. Thus, the grid spacing is relatively fixed by manufacture but the emission wavelengths of the laser sources can shift with temperature, i.e., can shift to longer wavelengths on an increase in temperature or shift to shorter wavelengths on a decrease in temperature, while the set wavelength grid spacing remains generally the same. This is illustrated pictorially in FIG. 2 where wavelength grid 46 is shown at 47 at ambient temperature $T_1$ and when the ambient increases to a new temperature, as indicated at 49 to $T_2$, the thermally uncontrolled wavelength grid of Tx channels shifts to a range of longer wavelengths while their grid channel spacing remains generally the same. Since there is no temperature control of Tx module 41, the wavelength grid 46 of TxPIC 43 is free to thermally float so that the emission wavelength of the modulated source lasers with also shift with temperature. Also, the wavelength grid of multiplexer 52 will shift with temperature so that the two wavelengths grids comprising the transmitter laser sources and the multiplexer can thermally shift simultaneously together. As an example, the laser source wavelength grid 46 (FIG. 3A) may shift at a rate of about 15 GHz/° C. while the wavelength grid of multiplexer 52 may move at a rate of about 12 GHz/° C. These rates are fairly close and can be accomplished by having the transmitters 48, such as, for example, integrated DFB laser diodes and external electro-optic modulators, be designed to have similar wavelength versus temperature coefficients as optical multiplexer 52. Therefore, the acceptably maintained alignment of their respective wavelength grids over a given temperature range can be realized. Optical multiplexer 52 is a wavelength selective type of combiner and may be, for example, an arrayed waveguide grating (AWG), an Echelle grating, or any other kind of wavelength selective combiner that has a wavelength comb or grid.

Figure 3:
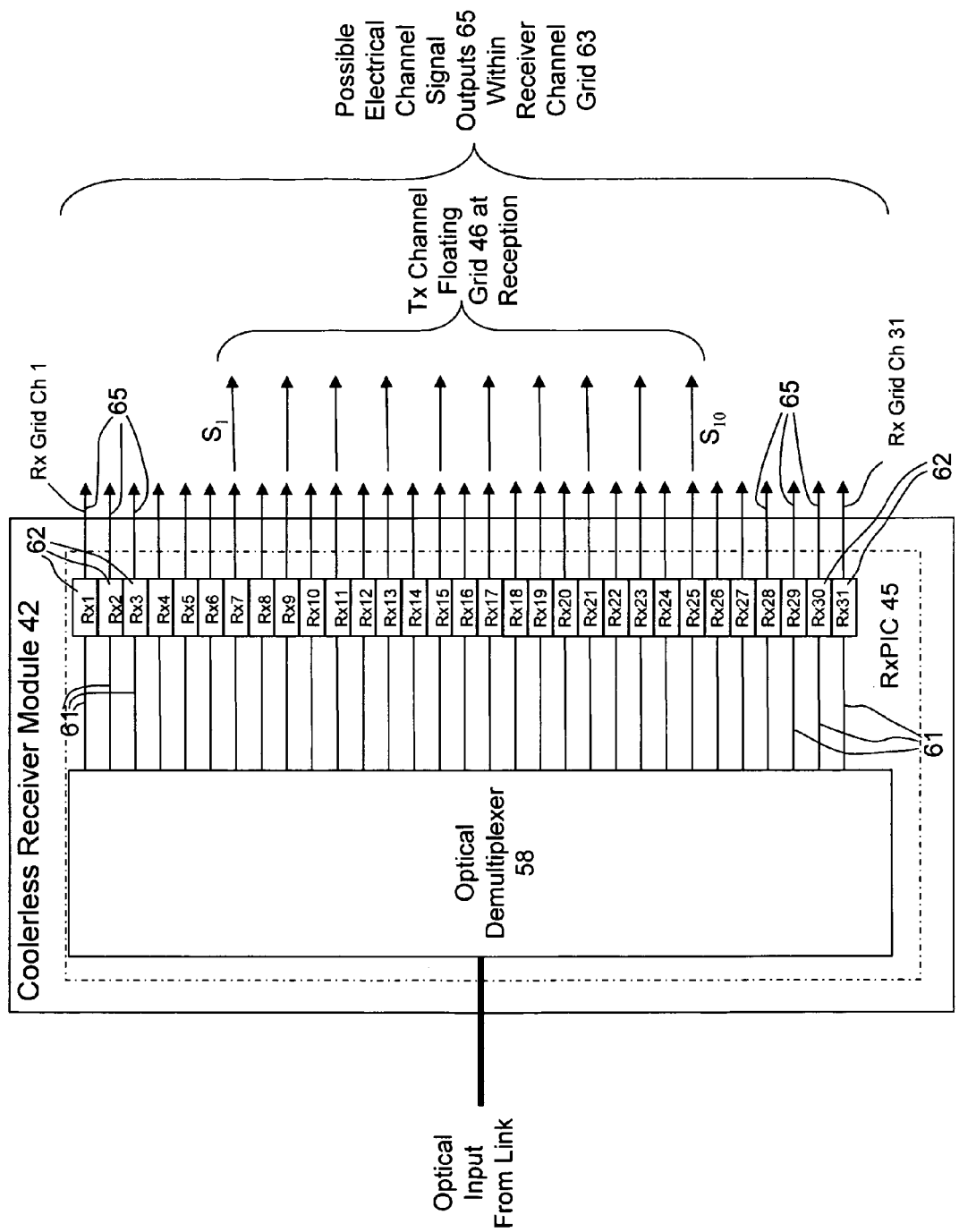
FIG. 3 is a more detailed view of the receiver module utilized in the practice of this invention.
Figure 3A:
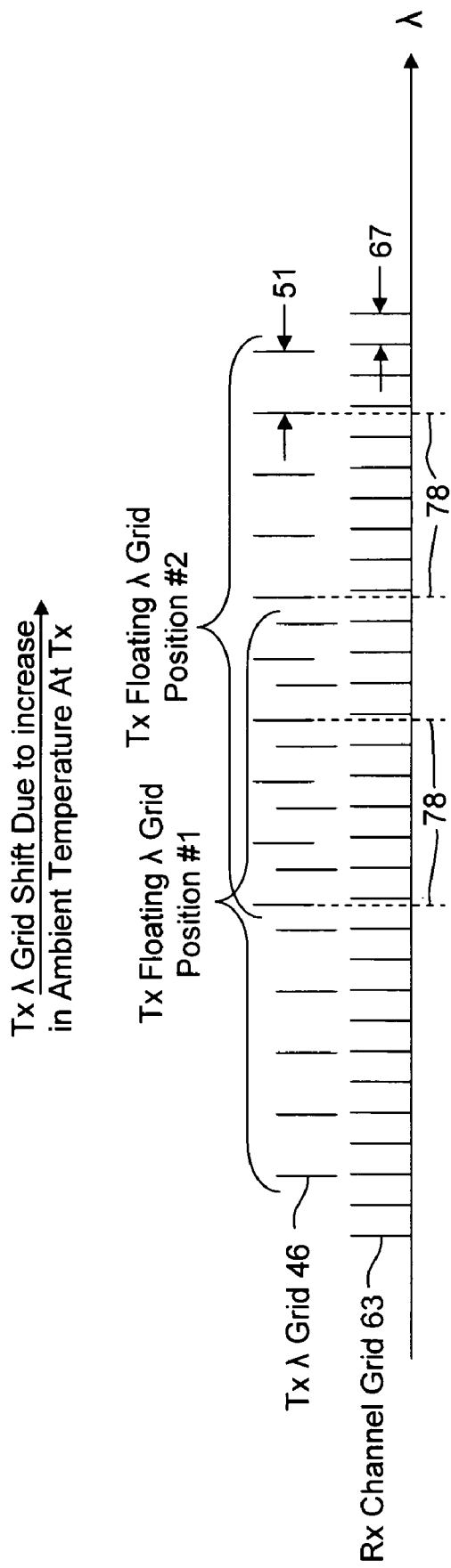
FIG. 3A is a diagrammatic illustration of the optical transmitter floating wavelength grid over the optical receiver wavelength channel grid.

In FIG. 3, there is shown a coolerless receiver module 42 that includes a RxPIC chip 45 comprising an optical demultiplexer 58, such as an arrayed waveguide grating (AWG) or an Echelle grating, or other such wavelength selective combiner that has a wavelength comb or grid, with a plurality of integrated output waveguides 61 coupled to a plurality of receivers (Rx) 62 each with an integrated photodetector and also possibly including with an accompanying TIA circuit. To be noted is that the number output waveguides 61 and corresponding photodetector receivers 62 form an Rx channel grid 63 where the number, $N_2$, of such Rx channels exceeds the number, $N_1$, of Tx signal channels. In the case shown here, there are thirty-one Rx channels comprising grid 63 which far exceeds the number of Tx signal channels of ten. As indicated above, $N_2$ can be greater than, equal to, or smaller than $N_1$. In the case here, $N_1$ is equal to 10 and $N_2$ is equal to 31. It should be further noted, as seen in FIG. 3A, that the grid channel spacing ($S_2$) 67 of Rx channel grid 63 at the Rx module 42 is different than the grid channel spacing ($S_1$) 51 at Tx module 41. The channel spacing 67 of the Rx channel grid 63 is either larger, smaller or the same as the channel spacing of Tx wavelength grid 46. In the embodiment here, as indicated above, the channel spacing 67 of Rx wavelength channel grid 63 is illustrated in FIG. 3A and is smaller than the channel spacing 51 of Tx wavelength grid 46. In particular, in the embodiment here, the grid spacing ($S_2$) 67 of Rx channel grid 63 is one-half of the channel spacing ($S_1$) 51 of the Tx channel grid 46. Therefore, if the Tx channel spacing ($S_1$) 51, respectively, is 50 GHz, 100 GHz, or 200 GHz, then the Rx grid spacing ($S_2$) 67 is, respectively, 25 GHz, 50 GHz, or 100 GHz. This difference in grid spacing permits the deployment of a scheme employing demultiplexer 58 as an Rx detection grid, so to speak, to detect the position of the transmitter floating wavelength grid 46 within and along the Rx detection grid 63 and, then, convert the demultiplexed and detected channel signals into electrical signals representative of the originally transmitted channel signals.

From the foregoing description, it can be readily seen that demultiplexer 58 filters the incoming optical power into different Rx wavelength channels on output waveguides 61. Since the Rx detection grid is comprised of a channel grid having a period smaller than the transmitted Tx wavelength grid period, the filtered power of various detected Tx channels can be easily detected by two adjacent Rx channel grid detectors where the power in a demultiplexed Tx channel signal is effectively split between two such adjacent Rx channel grid detectors. In this way, one of the two adjacent Rx channels having the larger power content can, then, be selected as the transmitted Tx channel signal.

Referring now again to FIG. 3, the incoming WDM signal comprising ten transmitted channel signals is demultiplexed by optical demultiplexer 58 and the comb of channel signals is provided on output waveguides 61 to corresponding receivers 62. The wavelength filtering function of demultiplexer 58 will comb the wavelength-dependent signals to a set of receivers 62 with the Rx channel grid or band 63 of plural receivers 62, here illustrated as thirty-one receivers 62. Those receivers 62 receiving a detectable signal, illustrated in FIG. 3 as channels Rx7, Rx9, Rx11, Rx13, Rx15, Rx17, Rx19, Rx21, Rx23 and Rx25, is the instantaneous position of the ten-channel floating wavelength grid 46 received from Tx module 41. Thus, the large array of Rx receivers 62 form a receiver detection grid 63 which functions to electrically detect at which positions along a receiver grid band where the Tx floating wavelength grid 46 may be so positioned along that grid permitting detection of the optical channel signals for converting the detected optical signals into electrical signals representative of the originally transmitted channel signals, which converted signals are then subsequently received by a clock and data recovery (CDR) circuit at the optical receiver. It can readily be seen that if the grid 46 of transmitter signals in FIG. 3 shifts with temperature change at the transmitter end, the receiver end is able to detect the Tx grid 46 as it basically is thermally shifted across the Rx channel detection grid 63. In this manner, the larger Rx channel grid 63 of demultiplexer 58 functions as a wavelength grid detection filter. This wavelength grid shift due, for example, to thermal ambient changes at the transmitter module 41, is further illustrated in FIG. 3A wherein the Tx wavelength grid position #1 is illustrated as a first given grid position of the ten Tx signal channels over at least a portion of the Rx channel detection grid 63. Due to ambient temperature change occurring at the transmitter (Tx), illustrated here as an increase in ambient temperature, the Tx wavelength grid position #1 changes to a new Tx wavelength grid position #2. Note that the Tx wavelength grid position #2 moves up or down the Rx channel grid 63 smoothly with temperature so that the Tx channel grid 46 may end up in a position between a set of Rx channel grid positions as seen in the illustration of FIG. 3A and indicated by the aligned position of dotted vertical lines 78. The best case scenario is if the Tx channel grid 46 is substantially on every other Rx grid channel, and the worst case scenario is if the Tx channel grid 46 is midway between the grid spacing (period) 67. These events will be discussed in more detail later. In any case, the comb of the Rx wavelength channel detection grid 63 is able to uncover the shift in the Tx channel grid through the detection of the transmitted and demultiplexed channel signals detected within and along the Rx channel grid 63 discerned from higher detected power levels in a series of Rx channel detectors along the Rx channel grid 63. As previously mentioned, the Tx grid spacing in FIG. 3A may be, respectively, 50 GHz, 100 GHz or 200 GHz while the Rx grid spacing is either larger, the same or smaller than the Tx grid spacing and is shown here to be smaller, respectively, as 25 GHz, 50 GHz or 100 GHz.

Figure 4:
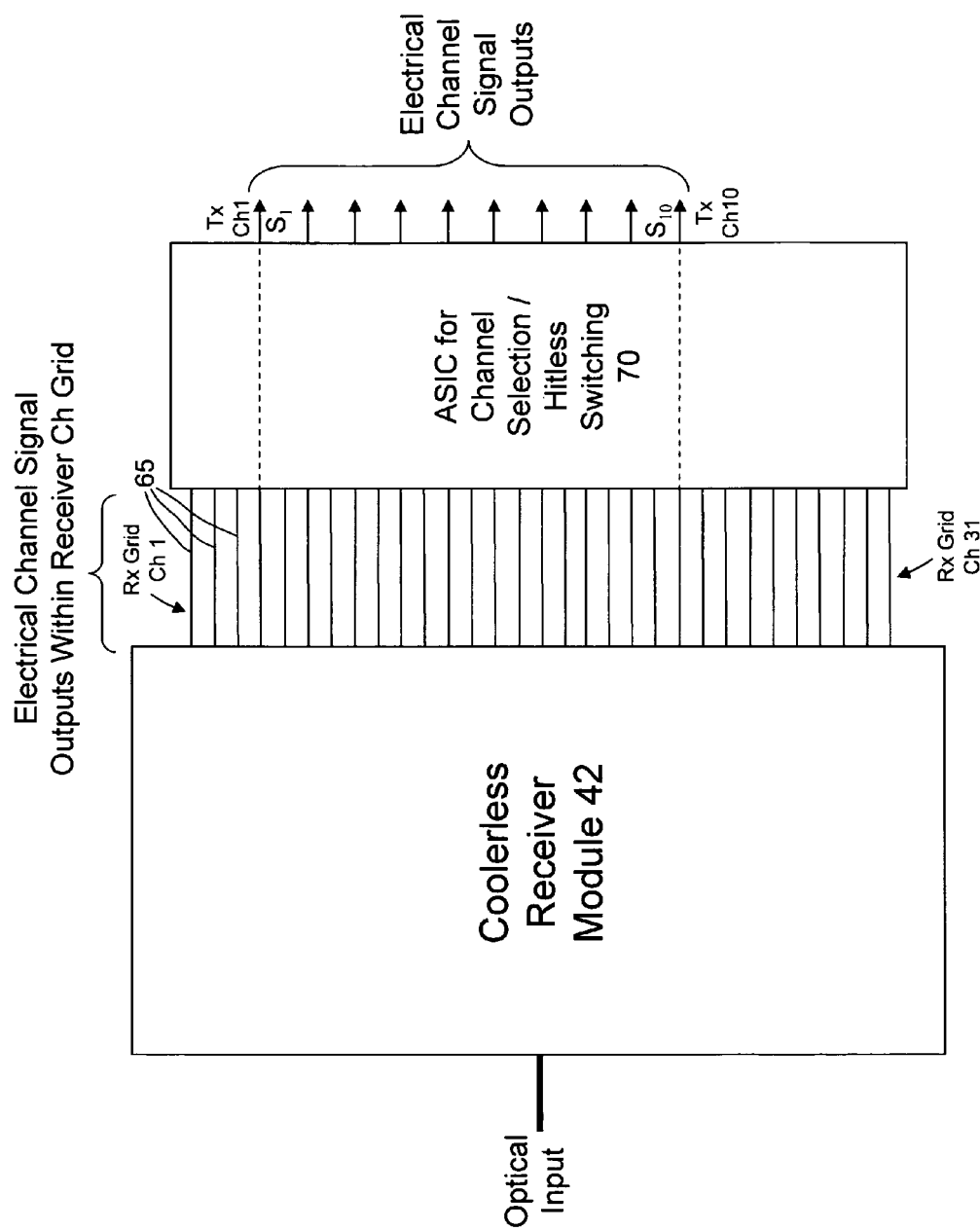
FIG. 4 is a further detailed view of the receiver module connected to an ASIC chip that performs the channels selection functions from the receiver channel grid and performs a hitless switch according to a shift of transmitter channels appearing along the receiver channel grid.

Reference is now made to FIG. 4 where the coolerless receiver module 42 provides the plurality of its electrical signal outputs 65 from Rx receivers 62 to an ASIC chip 70 that provides for best channel selection from the array of outputs 65 and performs hitless switching to provide a plurality of electrical outputs best representative of the ten channel signals $S_1$ to $S_{10}$ reproduced from the demultiplexed optical channel signals, $\lambda_1$ to $\lambda_{10}$. Hitless switching, in terms of telecommunication networks, is generally known as switching from one path to another path without taking any bit errors. In principal, one signal path is working and a second path, usually called the protection path, is also setup with the same signal before any switching occurs and the signal in the second path is aligned with the signal in the first path so that when switching is accomplished between the first and second paths, it is accomplished without the system experiencing any bit errors. Examples of hitless switching techniques are exemplified in U.S. Pat. No. 5,631,896, U.S. patent application Pub. No. US 2003/0165115 A1 and PCT International Pub. No. WO 2005/032036 A1, all of which are incorporated herein by their reference.

The easiest way to choose an optimum Tx channel grid from the Rx channel grid array is by determining the power levels appearing at each of the Rx channel outputs at 65 and then choosing the set of detected Tx signal channels having the highest power levels substantially within the expected Tx channel spacing. Beyond this simple approach, there is the option to look at channel signal levels within ASIC circuitry 70 and choose with that circuitry the best Tx signal channels based upon some digital parameter in addition to looking at the power of the detected channels. This additional parameter can be some kind of performance monitoring in ASIC circuitry 70 to render a decision relative to each channel in deciding which of two adjacent Rx channels to employ as the detected channel signal within the Tx wavelength grid. Alternatively, such monitoring may be also include monitoring the bit stream in each adjacent Rx channel to detect a balanced series binary condition of signal 1's and 0's (50:50) or employ FEC decoding in connection with each adjacent Rx channel to calculate their BER and then choose the channel with the lower rate.

In the application of hitless switching, when the Tx signal channels are split between adjacent signal channels in the Rx channel grid 63, as illustrated in FIG. 3A, both adjacent Rx signal channels between a given Tx channel signal will both sensationally experience at least a portion of the same Tx channel signal. There is the possibility that the two Rx signal channels have a differential time delay between them and possibly one or multiple bits of delay between the adjacent Rx signal channels. However, the Rx channels and the ASIC chip 70 can be designed to eliminate this delay so that a switch can be made from one Rx channel to the other Rx channel without any time delay, i.e., the time delay between adjacent Rx grid channels may be designed on all signal channels at ASIC chip 70 so that switching can be from one channel to an adjacent channel without missing an signal bits. In such a case, the ASIC circuitry 70 will have the designed capability to align in time the adjacent Rx signal channels by delaying the signal on one channel with respect to the other channel so they concurrently arrive at the same time at the switch so the hitless switching can be successfully carried out. On the other hand, such a delay can be ignored so that a few bit errors are incurred during a switch from one channel path to the next channel path and the accepted bit error can be overcome by employing forward error correction (FEC) and replace the error bits upon FEC decoding as is known in the art.

With respect to the particular exemplified embodiment of FIGS. 2 and 3, for ten Tx signal channels integrated on a TxPIC at Tx module 41, separated by a channel spacing 51 of 200 GHz, Rx module 42 would include a reception channel grid of 19 channels at 100 GHz spacing (i.e., one-half the Tx channel spacing 51) to cover the thermally floating Tx channels plus additional channels provided at each end of the Rx band. For the case where the Rx module 42 is uncooled, the operational temperature range can vary, for example, over 70° C., while at the same time the uncooled Tx multiplexer can vary over a range of 30° C. Then, this maximum range difference of 100° C. temperature can give rise to a wavelength offset for the Tx optical multiplexer 52 and the Rx optical multiplexer 58 of up to 1625 GHz. With the addition of eight Rx channels on each edge of the Rx reception channel grid 63, the resulting extended channel grid 63 can cover this potential offset range. Thus, this extreme case would, therefore, include 37 Rx receiver channels rather than the 31 Rx receiver channels illustrated in FIG. 3.

Figure 5:
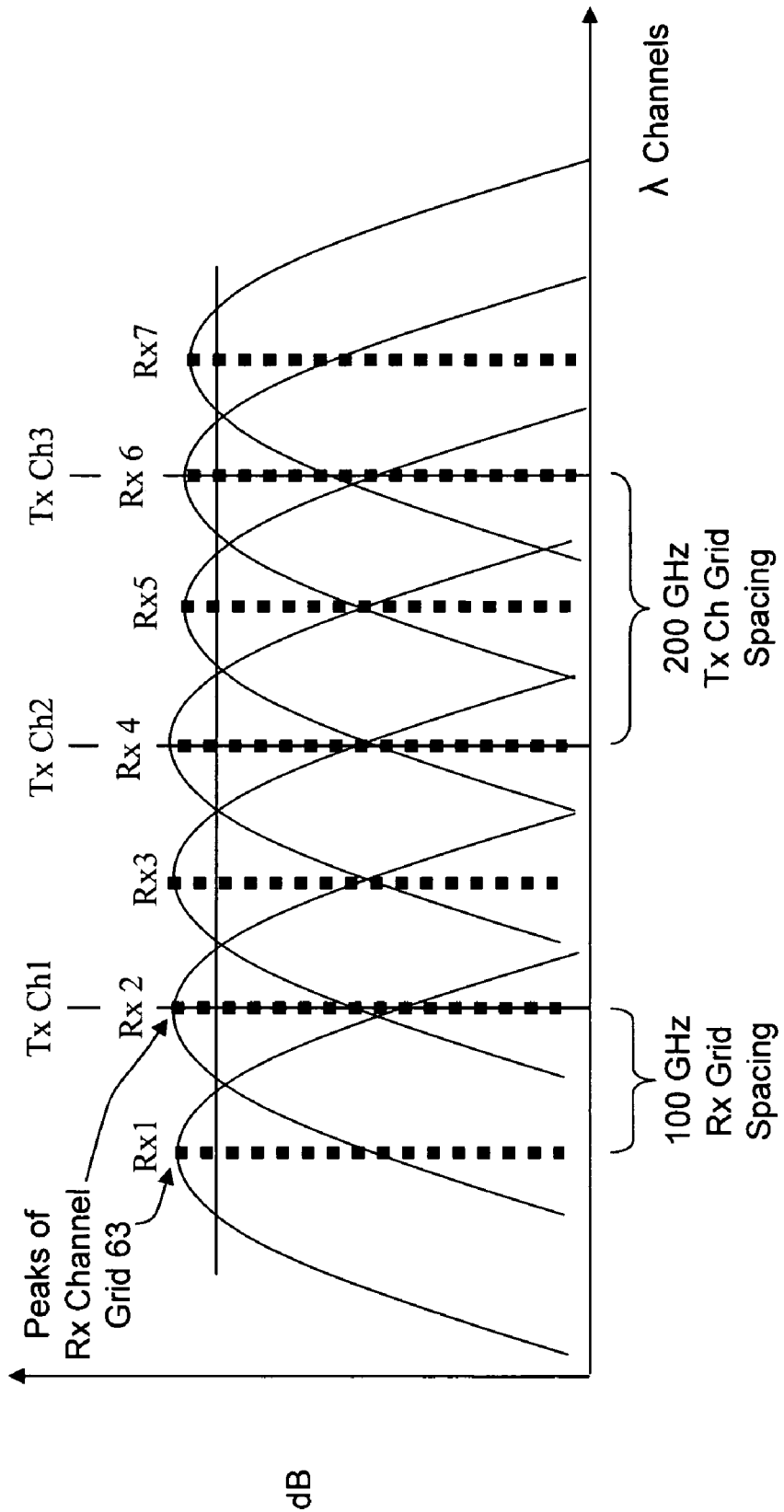
FIG. 5 is a graphic illustration of a desired case condition between the floating wavelength grid of the optical transmitter and the optical receiver channel grid.
Figure 6:
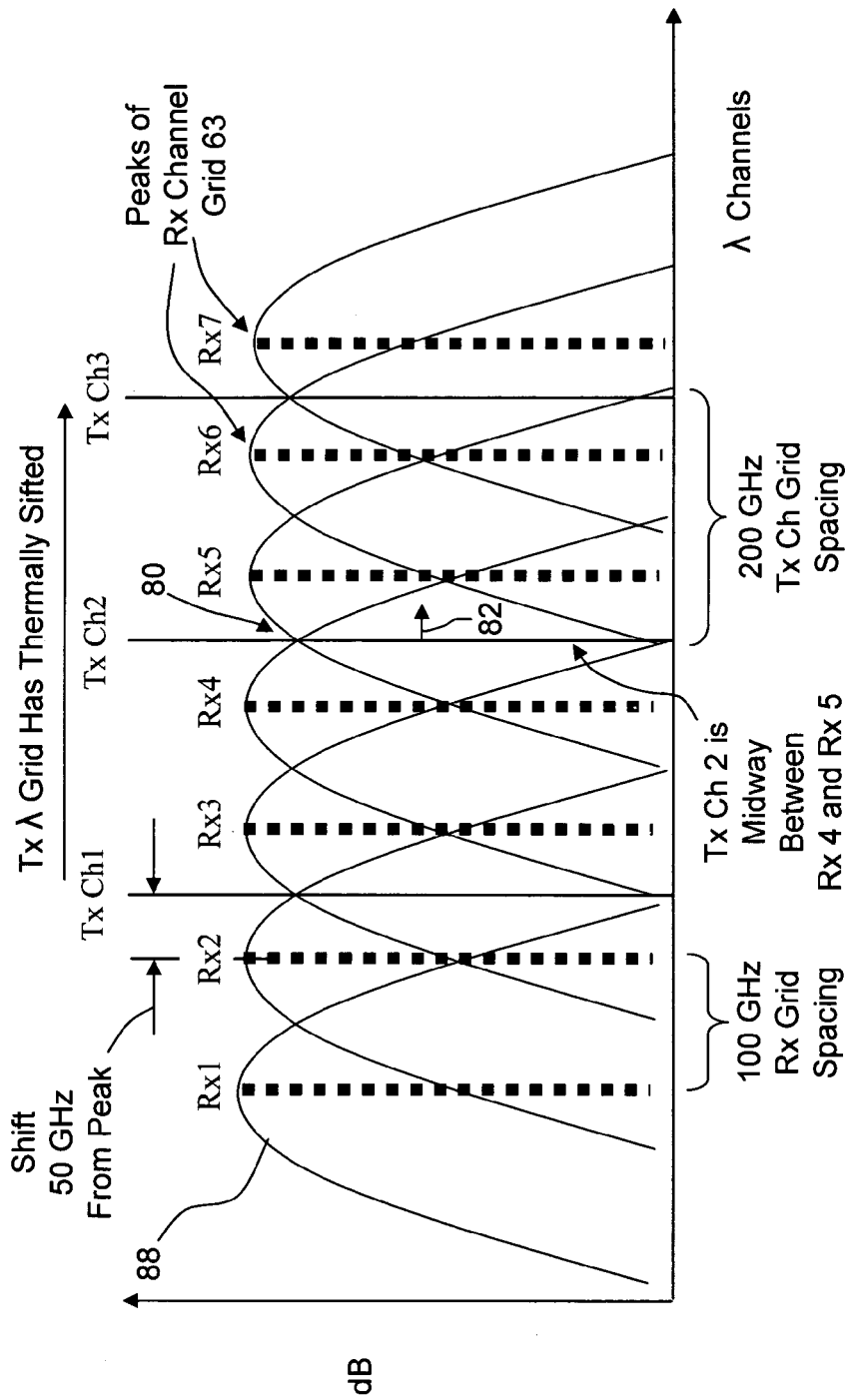
FIG. 6 is a graphic illustration of a worst case condition between the floating wavelength grid of the optical transmitter and the optical receiver channel grid.

Reference is now made to FIGS. 5 and 6 illustrate representations, respectively, of desired case condition and worst case condition in match up of the Tx wavelength grid 46 for three signal channels, Tx Ch1, Tx Ch2, and Tx Ch3, in the Tx wavelength grid 46 relative to the peak power positions of a plurality of Rx signal channels, Rx1, Rx2, Rx3, Rx4, Rx5, Rx6 and Rx7, within the Rx channel grid 63. These Tx and Rx peak power positions may be anywhere along grid 63 so that the representations of numerical channel numbers is not intended to match the numerical channel identification in FIGS. 2 and 3. In this example, the Tx channel spacing is representing as 200 GHz and the Rx channel grid spacing is represented as 100 GHz. FIG. 5 represents the desired case condition, for example, when the Tx wavelength grid 46 falls substantially on the peak points or positions of Rx channel grid 63, that is, Tx channels Ch1, Ch2, and Ch3 fall directly on every other Rx channel, Rx2, Rx4, and Rx6. In this case, the selection of the optimum correlating channels in the array of channels in grid 63 is a fairly simple task for ASIC 70. On the other hand, FIG. 6 represents the worst case condition where the Tx wavelength grid 46 falls substantially halfway between the peak points or positions of the Rx channel grid 63. In this case, the selection of the optimum correlating channels in the array of channels in grid 63 is more difficult task for ASIC 70 in that a decision must be made as to which set of Rx grid peak points are to be chosen to determine the optimum signal positions for recovery of the transmitted Tx channel signals.

The filter functions on demultiplexer 58 are made to overlap and have a given filter shape to be described later in connection with FIG. 7. The concept here is that when the incoming Tx channels are aligned with the peak points or positions of every other Rx channel in the Rx channel grid 63 due to its smaller channel spacing, as illustrated in FIG. 5, then the Rx channels, shown as Rx2, Rx4 and Rx6, are chosen to be the channel outputs of the Rx module by ASIC circuitry 70 which follows the photodetector receivers 62 in optical receiver module 42. Thus, in FIG. 5, the transmitted channels Tx Ch1, Tx Ch2 and Tx Ch3 are received by Rx channels, Rx2, Rx4 and Rx6 as the proper representation of the originally transmitted Tx channel signals.

Considering that the incoming transmitted Tx grid signal channels are thermally floating at the transmitter module 41 and these Tx channels move relative to the Rx channel grid 63 and, as indicated above, FIG. 6 is the worst case condition where the incoming Tx channels, shown here again as Tx Ch1, Tx Ch2 and Tx Ch3, fall midway between two adjacent Rx channels. As seen in the particular example of FIG. 6, this midway difference in the particular example here is a 50 GHz shift from the peak points of the two adjacent (Rx) channels. In this case, ASIC circuitry 70 will choose which one of these several adjacent Rx channel pairs are selected as the received Tx channel signals. As the wavelength offset between Tx and Rx channels changes, then the ASIC circuit 70 will at some point do a hitless switch from one Rx channel to the next adjacent Rx channel. The filter function is, therefore, optimized to have a low loss difference between the peak of an Rx channel and the crossover point in the center of the two Rx channels.

An alternative approach to the just explained position is to employ a heater at the optical transmitter for the purposes of only driving the ambient temperature higher on the Tx laser sources so that the Tx wavelength grid also shifts driving the grid to longer wavelengths to avoid the condition of the Rx channel grid falling midway between adjacent Rx channels on the Rx channel grid. Notification of this midway condition at the optical receiver can be accomplished as a signal on an optical supervisory channel (OSC) feedback over the optical link to the optical transmitter to turn on a transmitter heater and incrementally increase the ambient temperature at the transmitter laser sources, as much as is required, to drive the Tx wavelength grid off of the midway condition between adjacent Rx channels illustrated in FIG. 6. The transmitter heater controller, which is continually monitoring the transmitter ambient temperature, would note and store the ambient temperature at the transmitter at the time the transmitter heater is activated. No cooling would be required as that heated temperature would be maintained until later when the monitored ambient temperature of the optical transmitter significantly changed a predetermined amount above the stored value at the time of heater activation, then, after some predetermined time, the transmitter heater would be turn off until the optical receiver again notified the transmitter via OSC feedback that the midway condition was again being experienced at the optical receiver module 42.

Thus, then, the worst case condition for crosstalk is that shown in FIG. 6. The adjacent Tx channel, which is 200 GHz away from the current Tx channel, must be rejected by optical demultiplexer 58 that is receiving the current Rx signal channels. This means that the rejection at +/−150 GHz must be as high as required for the system to operate, e.g., 25 dB down as illustrated in FIG. 7.

An example is now given following the course of Tx channel, Tx Ch2. In FIG. 5, Tx Ch2 is aligned with Rx grid channel Rx4, which channel is employed as the output of a receiver 62. Rx4 must reject signals from adjacent Tx Ch1 and Tx Ch3 which are −/+200 GHz from the center of channel, Rx4 and several dB down from the Rx4 channel peak. As the offset between channel Tx Ch2 and channel Rx4 is increased, the signal is reduced in channel Rx2 and the crosstalk from one of the adjacent Tx channels correspondingly increases. At the instance of a worst case condition occurring, as seen in FIG. 6, where Tx Ch2 is midway between channels Rx4 and Rx5, the signal relative to Rx grid channel Rx4 is at its lowest point at 80 and the crosstalk from channel Tx Ch1, 150 GHz away from Rx grid channel Rx4, is at its maximum. As the offset between channel Tx Ch2 and Rx grid channel Rx4 increases further, as indicated by arrow 82, the ASIC circuitry 70 will ultimately choose and switch to Rx grid channel Rx5 as the optimum output channel thereby performing a hitless switch from the selection of output from Rx grid channel Rx4 to the new selection of output from Rx grid channel Rx5.

The ideal filter function for each channel in demultiplexer 58, with a channel separation of 100 GHz, would have little variation over +/−50 GHz. This would mean that two adjacent demultiplexer filters in the wavelength selection of the demultiplexer would cross at 50 GHz from midway center point with a relatively small power drop. Obviously, power cannot be produced in demultiplexer 58 so that, in order to achieve this shape, either the minimum insertion loss will be higher (>3 dB) or the drop at +/−50 GHz will be somewhat larger, say 3 dB. At the same time, crosstalk that would arise from adjacent Tx channels must be reduced by having sufficient rejection at +/−150 GHz from the channel center point.

Figure 7:
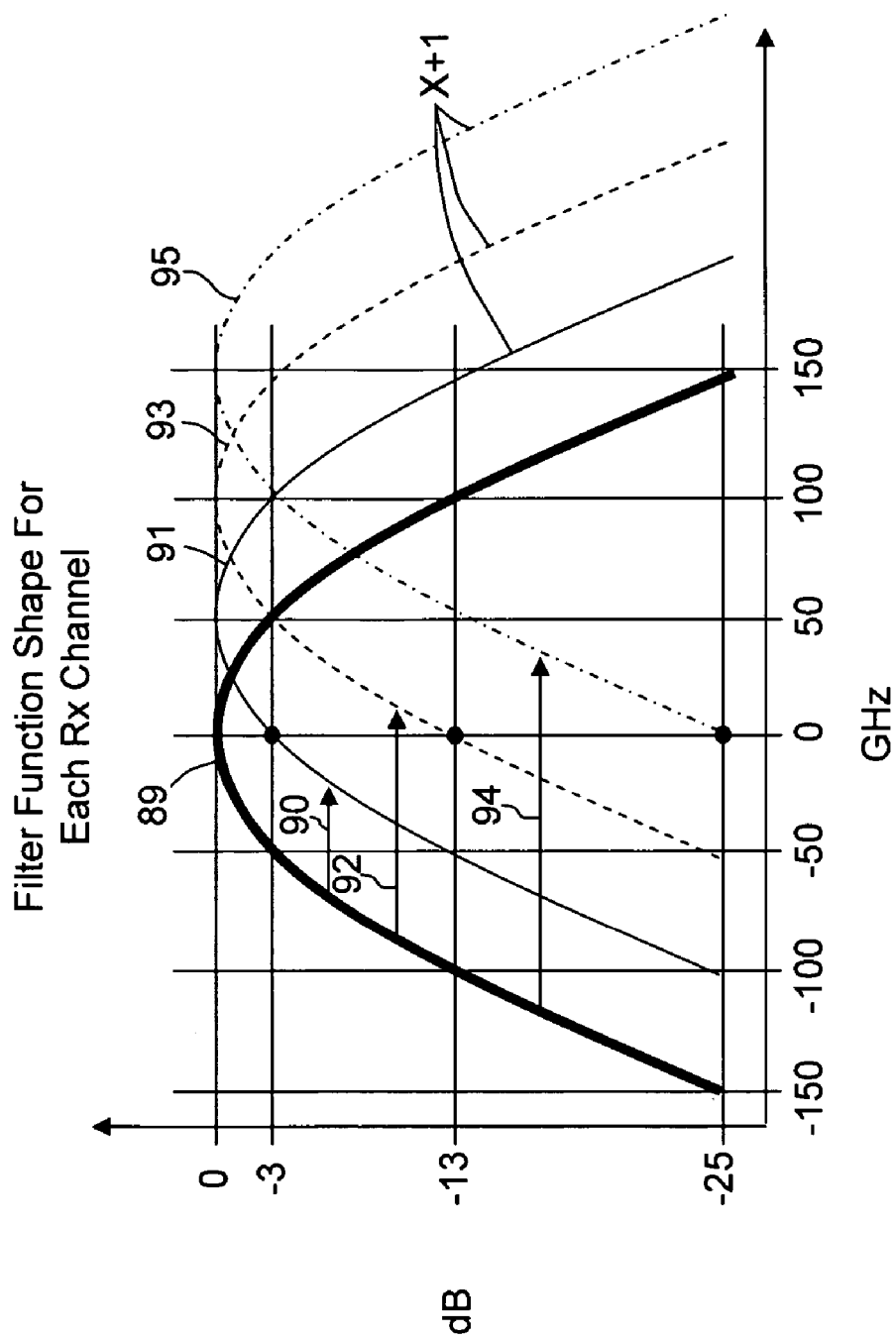
FIG. 7 is a graphic illustration of the filter function shape of each optical receiver channel on the optical receiver channel grid.

The required shape of the filter function for each channel in an Rx channel grid array with frequency spacing of 100 GHz is illustrated in FIG. 7 at 89. The channel at 89 will be, for purposes here, identified as channel X. While the amplitude scale shows a values of 0 dB at the peak for channel X at 89 in the comb of wavelengths filtered by the optical multiplexer, there will be some additional insertion loss to be accounted for so that that this peak value will not actually be zero but rather a few dB down, such as, for example, maybe 3 or 4 dB down. The strength of any adjacent channel wavelength will correspondingly be down that amount, but for the purposes of simplified illustration here, channel X is shown at 0 dB. In FIG. 7, it can be seen that for an adjacent channel X+1 at 91 with a 50 GHz spacing from channel X, as indicated by arrow 90, will be about 3 dB down in signal strength compared to channel X, for an adjacent channel X+1 at 93 with a 100 GHz spacing from channel X, as indicated by arrow 92, will be about 13 dB down in signal strength relative to channel X, and for an adjacent channel X+1 at 95 with a 150 GHz spacing from channel X, indicated by arrow 94, will be about 25 dB down in signal strength relative to channel X. These large differences in signal strength provide a reliable determination as to when a switch to an adjacent Rx grid channel should be made and, therefore, determinative of an accepted channel signal on a Tx wavelength grid of channel signals at the optical receiver.

Figure 8:
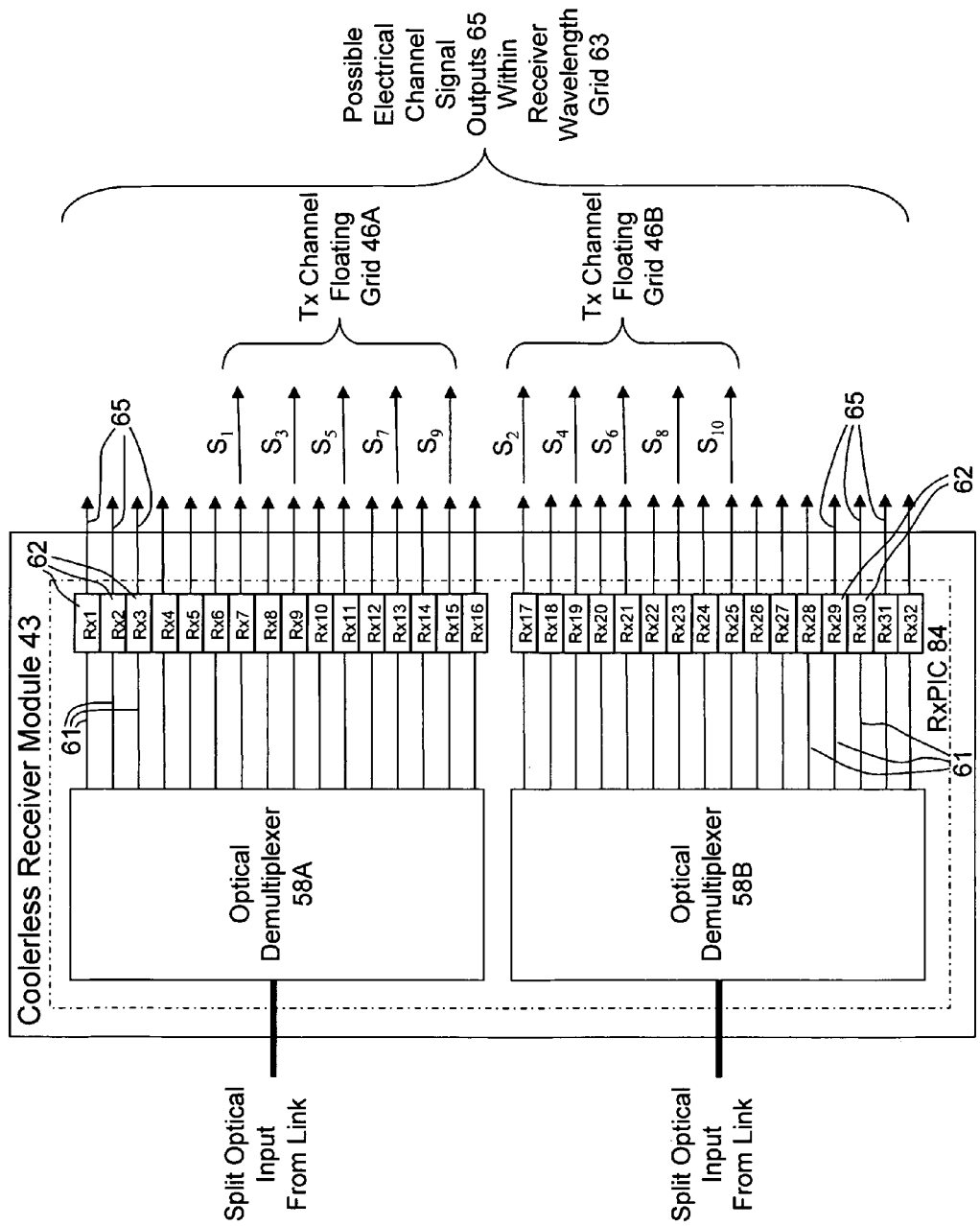
FIG. 8 is another embodiment of the receiver module utilized in the practice of this invention.

Another approach would be to have two multiplexer devices 58A and 58B on Rx PIC 84, as shown in FIG. 8, each having 200 GHz spacing, but having wavelength grids that are offset from each other by 100 GHz. The input power to the RxPIC could be split between the two multiplexers 58A and 58B which would be each provided with a set of outputs to corresponding receivers 62 that each include a photodetector. In this way, a 100 GHz channel grid can be produced at outputs 61 based upon two multiplexers 58A and 58B that each have separate wavelength grids of odd channels 46A and even channels 46B with 200 GHz channel spacing.

While the invention has been described in conjunction with several specific embodiments, it is evident to those skilled in the art that many further alternatives, modifications, and variations will be apparent in light of the foregoing description. For example, it is within the scope of this invention that the Rx channel grid may have a larger grid spacing or period than the Tx wavelength channel grid ($S_2 \geqq S_1$). In that case, it is likely that two or more transmitter signals will be present at each receive channel, and the receive module must employ hardware and software algorithms to evaluate the receive signals at each channel to determine the data in each of the original transmitted channels. This may be accomplished through multi-channel coding, where all transmitter channels are simultaneously coded to allow for error-free decoding at the receive end, together with the use of multi-level receivers at the receive end in order to sense the presence of one or more receive bits at a receiver within the same time interval. It is also within the scope of this invention that, rather than the Tx grid spacing and the Rx grid spacing being one-half of one another as set forth in the foregoing embodiments, these grid spacings can be equal, or different in a fractional way, e.g., one grid spacing is a fractional or smaller amount of the other grid spacing.

Furthermore, this invention is also applicable to cases where an array of optical transmitters has a grid of wavelengths that do not have a fixed wavelength separation, as can occur when separate transmitters are coupled together to provide the transmitted comb. In addition, the invention covers the option where there is only one transmitter, which may be a wavelength tunable transmitter that can vary its frequency across a band of wavelengths, the receiver module providing a single output associated with the single transmitter channel at whatever wavelength it is operated—in this way the receiver module works as a broadband wavelength tunable receiver. Also, the grid spacing of the M grid channels in the demultiplexer can be determined based upon the optical transmitter laser sources frequency or wavelength drift over life. For example, if the drift in laser source wavelength with temperature at the transmitter is over a bandwidth of 340 GHz, then the grid spacing at the optical receiver demultiplexer can be made some amount smaller than that band, such as one-half or 170 GHz, or one-quarter or 120 GHz, or other smaller value.

Thus, the invention described herein is intended to embrace all such alternatives, modifications, applications and variations as may fall within the spirit and scope of the appended claims.

What is claimed is:

1. A wavelength division multiplexed (WDM) optical communication system, comprising:
    a plurality of optical transmitters, each of which outputting a corresponding one of a plurality of optical signals, each of the plurality of optical signals having a corresponding one of a plurality of wavelengths, each of the plurality of optical transmitters includes a corresponding one of a plurality of lasers;
    an optical combiner configured to receive each of the plurality of optical signals and combine the plurality of optical signals into a WDM optical signal;
    an optical demultiplexer having an input and a plurality of outputs, the input of the optical demultiplexer being configured to receive the WDM optical signal, a number of the plurality of outputs being greater than a number of the plurality of optical signals, such that each of first outputs within the plurality of outputs supply a respective one of a plurality of portions of the WDM signal, and second outputs within the plurality of outputs do not supply a part of the WDM signal; and
    a plurality of receivers, each of which being coupled to a respective one of the plurality of outputs of the optical demultiplexer, first receivers within the plurality of receivers being coupled to a corresponding one of the first outputs within the plurality of outputs of the optical demultiplexer and receiving a corresponding one of the plurality of portions of the WDM signal, and each of second receivers within the plurality of receivers being coupled to a corresponding one of the second outputs within the plurality of outputs of the optical demultiplexer, such that no remaining portion of the WDM optical signal is fed to any of the second receivers, each of the first receivers supplying a corresponding one of a plurality of electrical receiver signal channels; and a circuit that is configured to receive the plurality of electrical receiver signal channels and select a group of electrical receiver signal channels from the plurality of electrical receiver signal channels, the circuit supplying a plurality of electrical outputs, each of which being indicative of a corresponding one of the selected group of the plurality of electrical receiver signal channels, wherein a number of the plurality of receivers is greater than the number of the plurality of optical signals and a number of the plurality of lasers, and a number of the first receivers is greater than a number of the plurality of optical signals.

2. A wavelength division multiplexed optical communication system in accordance with claim 1, further including:
a first integrated circuit including the plurality of optical transmitters and the optical combiner; and
a second integrated circuit including the optical demultiplexer and the plurality of optical receivers.

3. A wavelength division multiplexed optical communication system in accordance with claim 2, wherein the optical demultiplexer includes an arrayed waveguide grating.

4. A wavelength division multiplexed optical communication system in accordance with claim 2, wherein the optical demultiplexer includes an Echelle grating.

5. A wavelength division multiplexed optical communication system in accordance with claim 1, wherein the number of the plurality of outputs of the optical demultiplexer is twice the number of the plurality of optical signals.

6. A wavelength division multiplexed optical communication system in accordance with claim 1, wherein the plurality of wavelengths conform to a first wavelength grid and the optical demultiplexer has an associated second wavelength grid, the first wavelength grid has an associated first spacing and the second wavelength grid has a second spacing less than the first spacing.

7. A wavelength division multiplexed optical communication system in accordance with claim 6, wherein the first spacing is twice the second spacing.

8. A wavelength division multiplexed optical communication system in accordance with claim 1, wherein the optical combiner includes an arrayed waveguide grating.

9. A wavelength division multiplexed optical communication system in accordance with claim 1, wherein the optical combiner includes an Echelle grating.

10. A wavelength division multiplexed optical communication system in accordance with claim 1, wherein the circuit is further configured to monitor a power associated with each of the plurality of portions of the WDM signal.

11. A wavelength division multiplexed optical communication system in accordance with claim 1, wherein each of the plurality of optical signals carries a corresponding one of a plurality of bit streams, the circuit being configured to monitor each of the plurality of bit streams.

12. A wavelength division multiplexed optical communication system in accordance with claim 1, wherein each of the plurality of plurality of electrical receiver signal channels has an associated one of a plurality of bit error rates (BERs), the circuit being configured to determine each of the BERs.

\* \* \* \* \*